United States Patent [19]

Lin

[11] Patent Number: 5,072,751

[45] Date of Patent: Dec. 17, 1991

[54] VALVE ASSEMBLY

[76] Inventor: I-Chien Lin, No. 17-3, Chin-Hua St., Taipei, Taiwan

[21] Appl. No.: 677,634

[22] Filed: Mar. 28, 1991

[51] Int. Cl.⁵ ............................................. F16K 31/26
[52] U.S. Cl. .................................... 137/429; 137/442; 137/435; 137/444
[58] Field of Search ............... 137/444, 429, 442, 434, 137/435, 437

[56] References Cited

U.S. PATENT DOCUMENTS

| | | | |
|---|---|---|---|
| 1,279,468 | 9/1918 | Smith | 137/444 |
| 1,725,875 | 8/1929 | Luhr | 137/429 |
| 1,893,859 | 1/1933 | Gleason | 137/444 X |
| 2,738,801 | 3/1956 | Reaves | 137/444 X |
| 2,970,488 | 2/1961 | Skillings | 137/429 X |

Primary Examiner—Alan Cohan

Attorney, Agent, or Firm—Pasquale A. Razzano

[57] ABSTRACT

A valve assembly includes a tubular member, a hollow case connected to an open end of the tubular member, a linkage having a first end pivotally connected to the hollow case, a float connected to a second end of the linkage, and a control valve member movably mounted in the tubular member. A plate member is connected to the open end in the case to close the open end. The plate member has a smaller hole communicating with the open end. A narrower end of the control valve member passes through the open end and a through hole of the case, being pivotally connected to the linkage. The wider end of the control valve member is moved to close the hole of the plate member when the linkage is rotated by the float in a first direction, and to open the hole of the plate member when the linkage is rotated in an opposite second direction.

4 Claims, 6 Drawing Sheets

VALVE ASSEMBLY

BACKGROUND OF THE INVENTION

1. Field of the Invention

This invention relates to a valve, more particularly to a valve assembly which can be used in conjunction with high hydraulic pressure. This valve assembly can be mounted in a horizontal or vertical position.

2. Description of Related Art

A conventional valve device is vertically mounted in a reservoir. The conventional valve device includes a linkage having a first end provided with a control valve member, and a second end provided with a float. When the liquid level in the reservoir recedes, so the float descends, the control valve member moves upward, opening, to allow the liquid to flow upward into the reservoir. Then, as the liquid level has increased and reached the desired volume, the float is raised, and the control valve member is moved downward, closing, to stop the flow of the liquid.

When the conventional type of valve device is used in high pressure hydraulic systems, the control valve member is easily dislodged from the closed position by the upward hydraulic pressure. This tendency to leak constitutes a serious disadvantage. Furthermore, a valve of this type cannot be mounted horizontally in the reservoir, should the reservoir have a horizontal liquid inlet.

SUMMARY OF THE INVENTION

Therefore, an object of this invention is to provided a valve assembly which can be used with high hydraulic pressure.

An another object of this invention is to provide a valve assembly that can be mounted in a horizontal or vertical position.

Accordingly, a valve assembly of this invention includes a tubular member having a first open end, and a second open end. A hollow case is connected to the second open end of the tubular member. The case has a through hole aligned with the second open end of the tubular member, and an opening communicating the interior and exterior of the case. A plate member is connected to the second open end in the case to close the second open end. The plate member has a hole communicating with the second open end. The hole of the plate member has a diameter smaller than the inner diameter of the second open end.

A linkage has a first end pivotally connected to the hollow case, and a second end. A float is connected to the second end of the linkage, in such a manner that the linkage can be rotated about the first end of the linkage in either of two opposite directions.

A control valve member is movably mounted in the tubular member. The control valve member includes a rod which has a first end and a second end, and a cone member which has a flat base connected to the first end of the rod. The cross-section of the rod is smaller than the cross-section of the flat base of the cone member, and the cross-section of the flat base of the cone member is in turn smaller than the inner diameter of the tubular member. The second end of the rod passes through the second open end of the tubular member and the through hole of the case, and is pivotally connected to the linkage between the first and second ends of the linkage, adjacent to the first end of the linkage. The cone member of the control valve member closes the hole in the plate member when the linkage is rotated by the float in a first direction, and opens the hole in the plate member when the float rotates the linkage in an opposite second direction.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1:
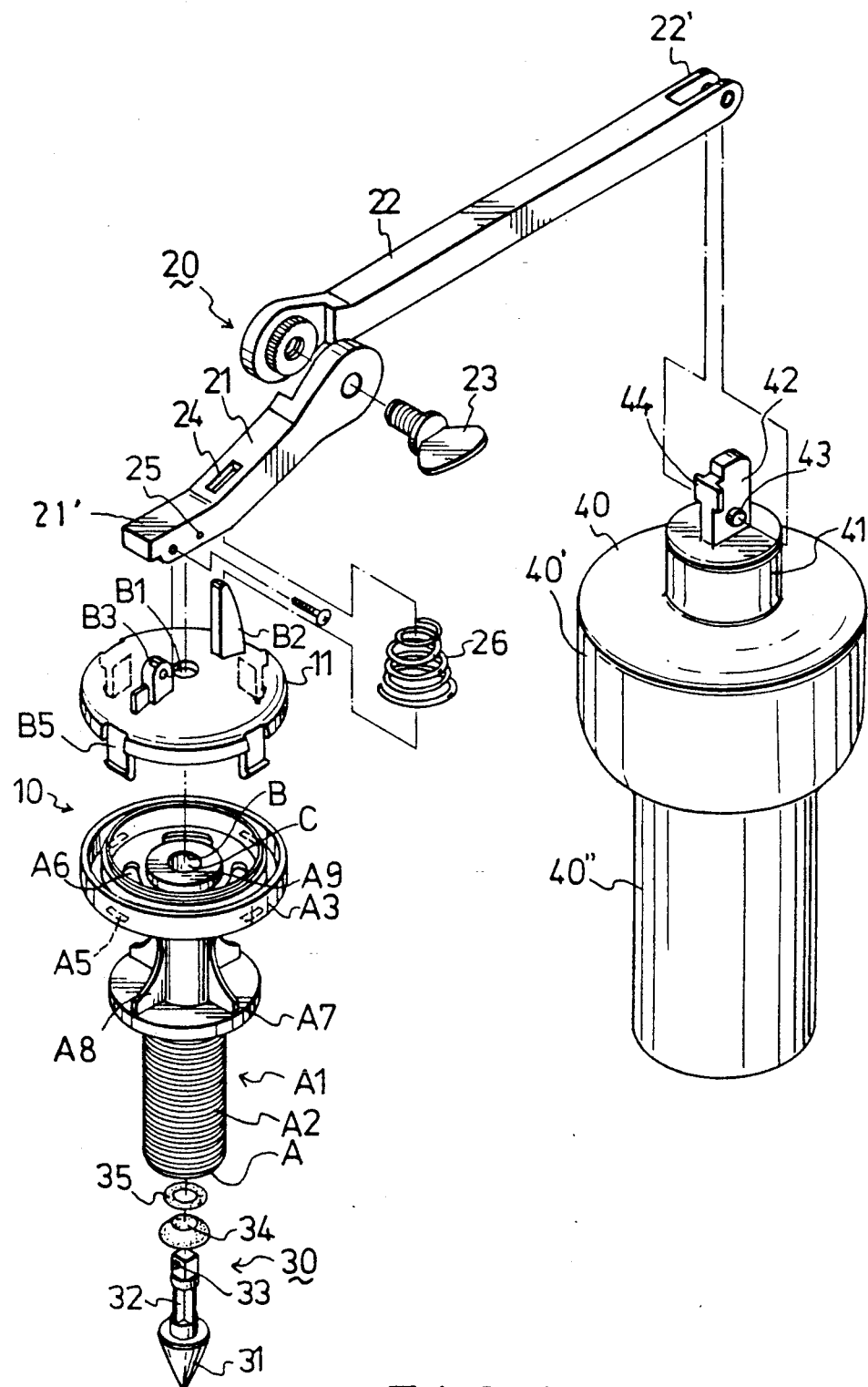
FIG. 1 is an exploded view of a preferred embodiment of a valve assembly of this invention.
Figure 2:
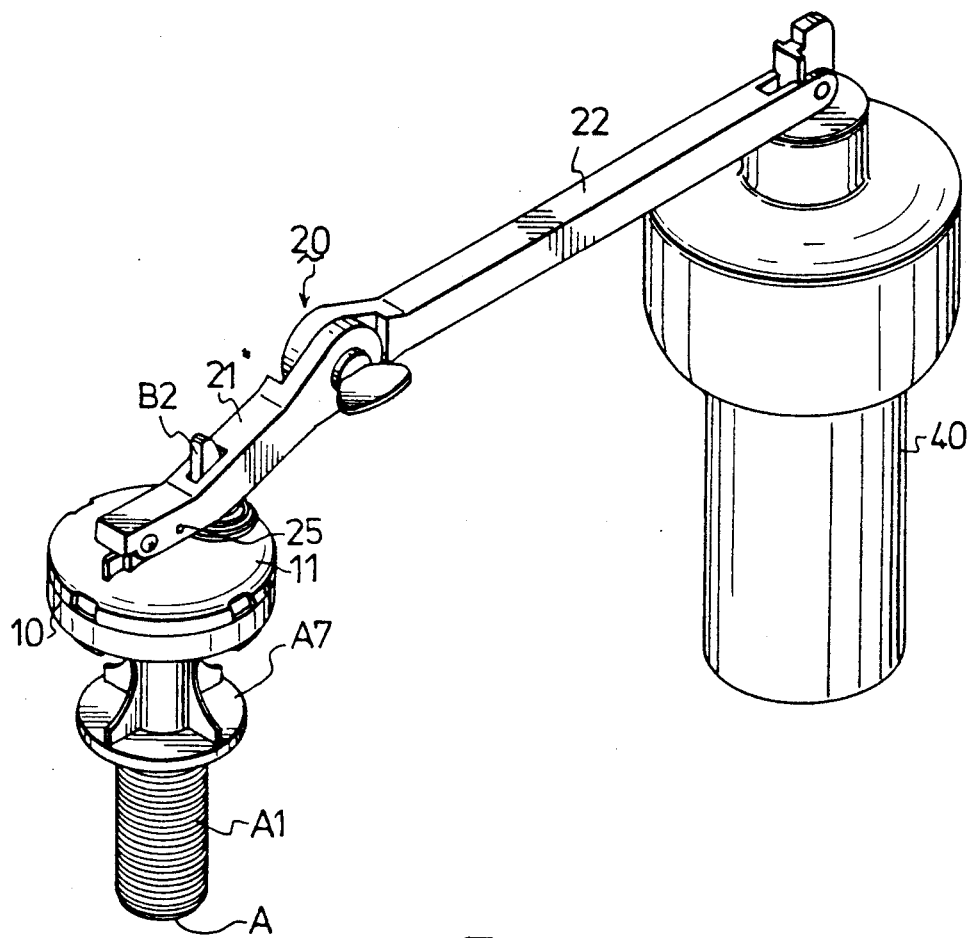
FIG. 2 is an assembled perspective view of the preferred embodiment of the valve assembly shown in FIG. 1.
Figure 3:
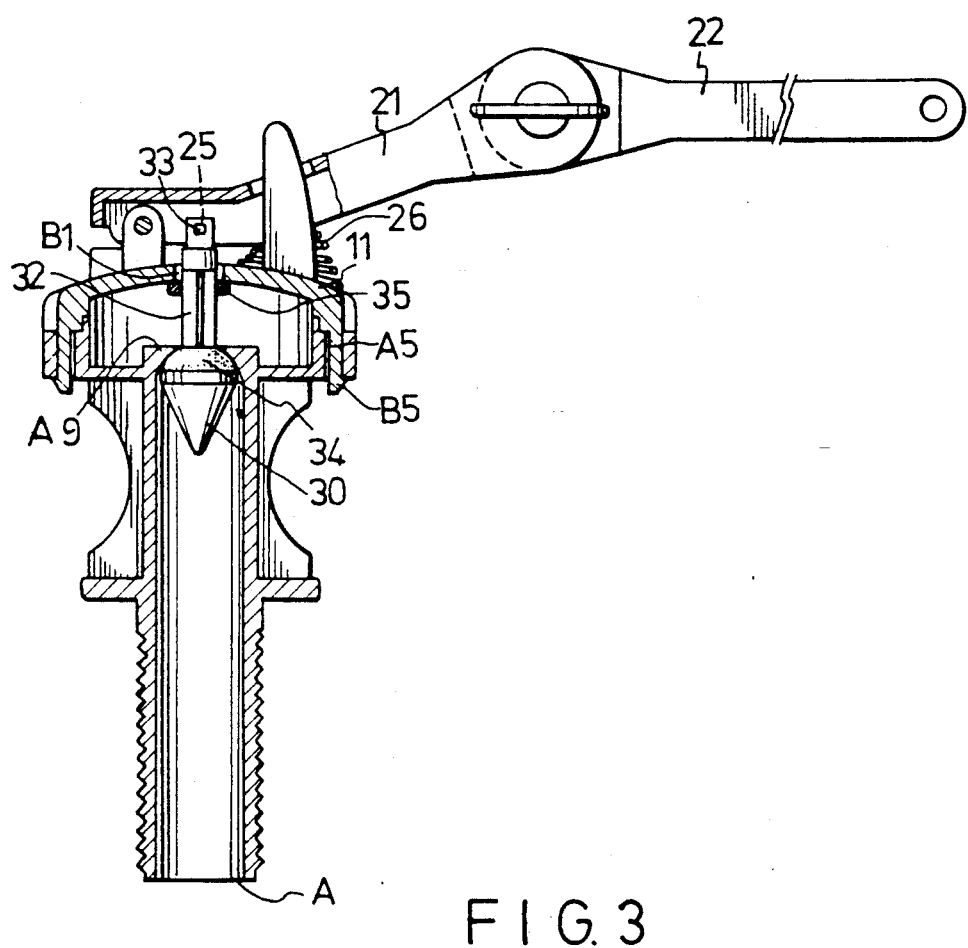
FIG. 3 is a partially sectional view of FIG. 2.

Referring to FIGS. 1, 2, and 3, a valve assembly includes a tubular member (A1) which has a first open end (A), and a second open end (B). The first open end of the tubular member (A1) is provided with outer threads (A2). A hollow case 10 includes a hollow body (A3), and a cover 11. The hollow body (A3) is connected to the second open end (B) of the tubular member (A1). The case 10 has a through hole (B1) aligned with the second open end (B) of the tubular member (A1). The hollow body (A3) has a plurality of openings (A6) formed therein to communicate the interior and exterior of the case 10. A plate member (A9) which is provided in the hollow body (A3) is connected to the second open end (B) to close the same. The plate member (A9) has a central hole (C) communicating with the second open end (B). The central hole (C) has a diameter smaller than the inner diameter of said second open end (B). The hollow body (A3) includes an annular outer wall, and an annular inner wall. The hollow body (A3) has a plurality of holes (A5) formed between the annular outer and inner walls. The cover 11 includes a plurality of downwardly and outwardly curved clips (B5) extending from the outer edge of the cover 11, the clips (B5) being respectively associated with the holes (A5) of the hollow body (A3). The cover 11 includes two upwardly extending protrusions: a first protrusion (B3) and an opposite second protrusion (B2). A spring 26 is sleeved over the second protrusion (B2). The cover 11 engages the hollow body (A3) by the clips (B5) of the cover 11 passing through the holes (A5) of the hollow body (A3). The tubular member (A1) includes a reinforcing means, which includes a disc (A7) and a plurality of rib members (A8), mounted thereon, under the case 10.

A linkage 20 has a first link arm 21, and a second link arm 22. The second link arm 22 is releasably fixed to the first link arm 21 by a thumb bolt 23. The angle formed between the first and second link arms, 21 and 22, is adjustable. The first link arm 21 has a first end 21' pivotally connected to the first protrusion (B3) of the cover 11, and a through hole 24, through which the second protrusion (B2) of the cover 11 passes. The spring 26 is located between the first link arm 21 and the cover 11 to prevent the linkage 20 from moving violently. The second link arm 22 has a second end 22'. A float 40 includes a first cylinder 40', and a second cylinder 40". The first cylinder 40' is shorter and wider than the second cylinder 40". The center of gravity of the float 40 is located in the second cylinder 40". The float 40 includes a round plate 41 extending outwardly from the first cylinder 40', and an oblong protrusion 42 extending outwardly from the round plate 41. The oblong protrusion 42 has a pair of lugs 43 at one end thereof. The float 40 is connected to the second link arm 22 by the pair of lugs 43, which are pivotally connected to the second end 22' of the second link arm 22. The oblong protrusion 42 has a pair of stopper tabs 44 formed thereon, which is adjacent to the pair of lugs 43. The second link arm 22 abuts the stopper tabs 44 to limit the rotation range of the float 40 relative to the second link arm 22.

A control valve member 30 is movably mounted in the tubular member (A1). The control valve member 30 has a rod 32 which has a first end and a second end, and a cone member 31 having a flat base connected to the first end of the rod 32. The cross-section of the rod 32 is smaller than the cross-section of the flat base of the cone member 31. The cross-section of the flat base of the cone member 31 is smaller than the inner diameter of the tubular member (A1). The second end of the rod 32 has a pair of lugs 33. A rubber washer 35 is sleeved on the rod 32, under the pair of lugs 33. The cone member 31 is provided with a soft washer 34 which is sleeved over the rod 32, to rest on the flat base of the cone member 31. The second end of the rod 32 of the control valve member 30 passes through the second open end (B) and the through hole (B1), and is pivotally connected to the first link arm 21 at a pivot point 25 by the pair of lugs 33 of the rod 32.

Figure 4:
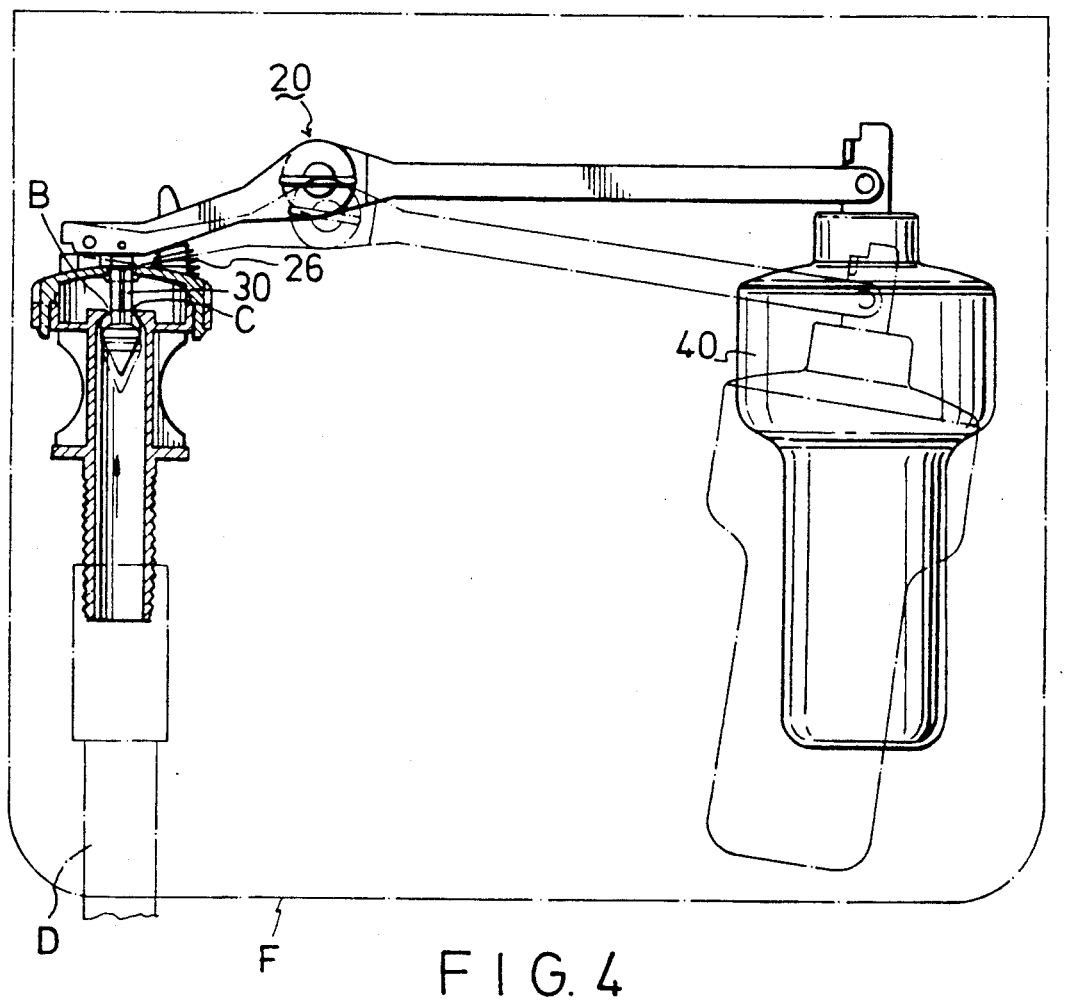
FIG. 4 is an operational schematic view of the valve assembly of this invention.

Referring to FIG. 4, the valve assembly is disposed in a reservoir (F), and the first open end (A) of the tubular member (A1) is connected to a liquid supply (not shown) through a conduit (D). When the float 40 is at a low level, the linkage 20 approaches the lower extreme of its rotation range, so that the cone member 31 of the control valve member 30 is spaced from the second open end (B). As liquid flows into the reservoir through the first open end (A), the second open end (B), and the openings (A6) of the hollow body (A3), the float 40 rises gradually, so the linkage 20 moves toward the upper extreme of its range, rotating about the first end of the first link arm 21. Thus, the cone member 31 of the control valve member 30 is actuated by the linkage 20 to move upward, closing the central hole (C) of the plate member (A9) and stopping the flow of the liquid. When the liquid level of the reservoir is decreased, the float 40 falls down again, so the linkage 20 and the cone member 31 move downward, thereby allowing the liquid to flow into the reservoir.

Figure 5:
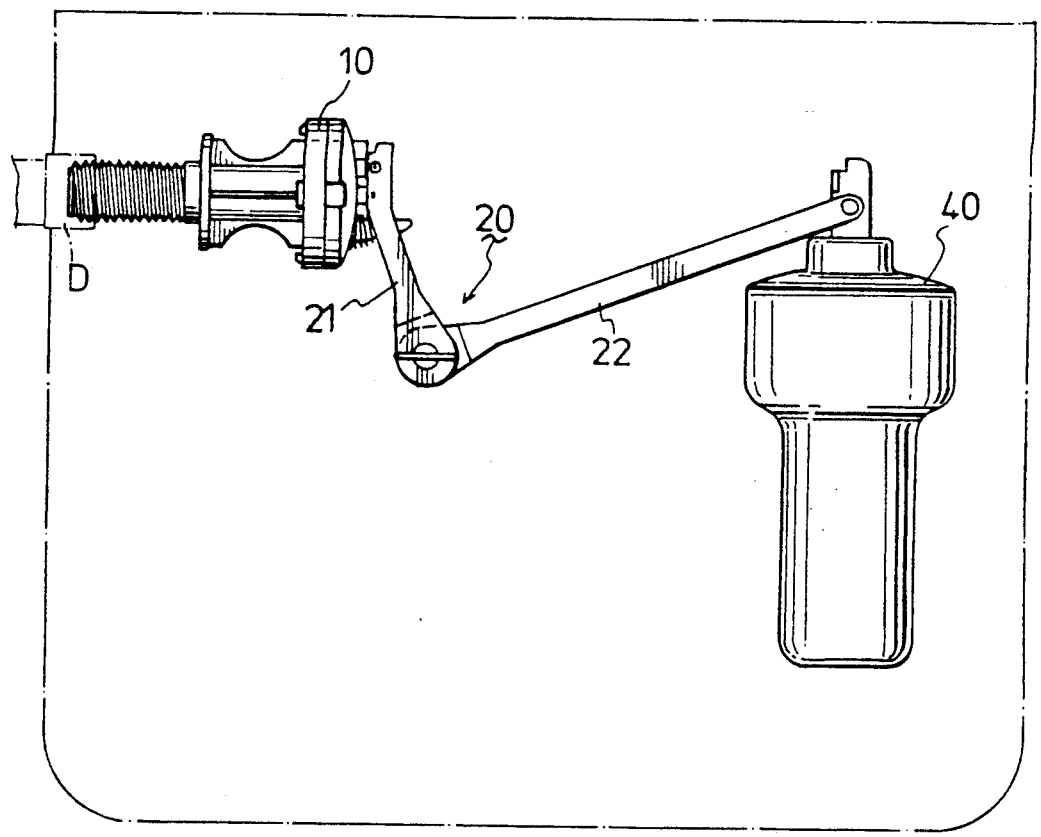
FIG. 5 is a schematic view of the valve assembly, the tubular member and the hollow case of the valve assembly being mounted in a horizontal position.
Figure 6:
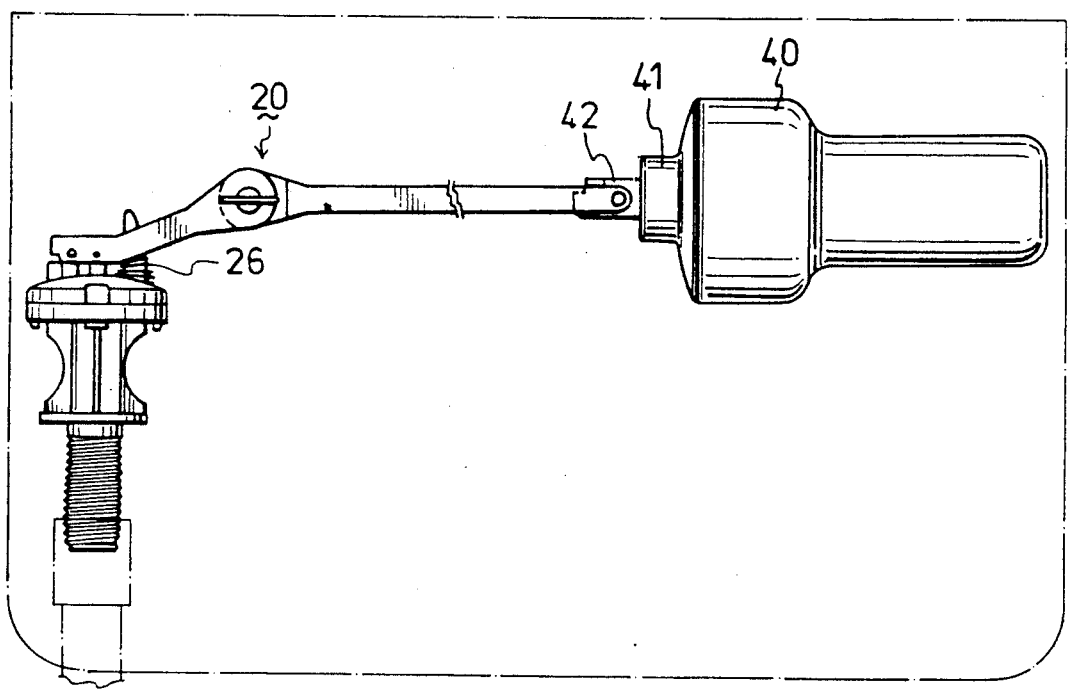
FIG. 6 is a schematic view of the valve assembly, the float of which is mounted in a horizontal position.

Referring to FIG. 5, when the liquid is horizontally supplied into the valve assembly, the tubular member (A1) and the closed case 10 are disposed in a horizontal position. In this case, the first and second link arm, 21 and 22, are connected as shown, so the case 10 and the float 40 retain the same cooperative association in the vertical case. FIG. 6 shows that the float 40 can be disposed in a horizontal position. This position permits the linkage 20 and the float 40 to produce a greater moment of force. So that the cone member 31 can be effectively moved upwardly to its closed position. The arrangement of FIG. 6 is more advantageous for high hydraulic pressure.

The control valve member 30 of the valve assembly is moved to close the hole (C) of the plate member (A9) in a direction which is identical to the direction of the flow of the liquid. Therefore, when the hydraulic pressure of the liquid is higher, the control valve member 30 can be maintained in the closed position and cannot be opened by the hydraulic pressure. Furthermore, the valve assembly can be mounted in a horizontal or vertical position, as desired.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:
1. A valve assembly comprising:
a tubular member including a first open end and a second open end;
a hollow case connected to said second open end of said tubular member, said case having a through hole aligned with said second open end of said tubular member and an opening communicating the interior and exterior of said case, a plate member connected to said second open end in said case to close said second open end, said plate member having a hole communicating with said second open end, said hole of said plate member having a diameter smaller than the inner diameter of said second open end;
a linkage having a first end, pivotally connected to said hollow case, and a second end; said linkage extending across and spaced from the through hole in the casing; and compression spring means positioned between said linkage and said casing located on the casing diametrically opposite the pivotal connection of the linkage to the casing for damping pivotal movement of the linkage;
a float pivotally connected to said second end of said linkage, in such a manner that it can rotate said linkage about said first end of said linkage in a first direction and an opposite second direction; said float comprising upper and lower hollow cylindrical float sections wherein said upper float section has a larger diameter and smaller height than said lower float section, with the center of gravity of the float being located within said lower float section; and
a control valve member movably mounted in said tubular member, said control valve member including a rod which has a first end and a second end, and a core member which has a flat base connected to said first end of said rod, the cross-section of said rod being smaller than the cross-section of said flat base of said core member, the cross-section of said flat base of said core member being smaller than the inner diameter of said tubular member, said second end of said rod passing through said second pen end of said tubular member and said through hole of said case, said second end of said rod being pivotally connected to said linkage between said first end of said linkage and said spring means, said one core member of said control valve member being moved to close said hole of said plate member when said linkage is actuated by said float to rotate in said first direction and to open said hole of said plate member when said linkage is actuated by said float to rotate in said second direction.

2. A valve assembly as claimed in claim 1, wherein said linkage includes a first link arm, and a second link arm releasably fixed to said first link arm.

3. A valve assembly as claimed in claim 1, wherein said float includes a lug which is pivotally connected to said second end of said linkage, and a stopper tab formed adjacent to said lug.

4. A valve assembly as defined in claim 1 wherein said plate member has a generally hemispherical recess formed therein surrounding the hole of the plate member defining a valve seat and said core member has a generally hemispherical seal mounted on its flat base and being generally complementary to said seat to form a seal therewith to close the hole of the plate member.

* * * * *